(12) United States Patent
Linehan

(10) Patent No.: US 6,327,578 B1
(45) Date of Patent: *Dec. 4, 2001

(54) FOUR-PARTY CREDIT/DEBIT PAYMENT PROTOCOL

(75) Inventor: Mark Linehan, Yorktown Heights, NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,869

(22) Filed: Dec. 29, 1998

(51) Int. Cl.[7] .................................................. G06F 12/14
(52) U.S. Cl. ............................. 705/65; 713/156; 713/172
(58) Field of Search .................................... 705/26, 17, 16, 705/27, 65; 713/159, 172, 156; 379/93, 12

(56) References Cited

U.S. PATENT DOCUMENTS

| | | |
|---|---|---|
| 4,799,156 | 1/1989 | Shavit et al. . |
| 5,495,533 | 2/1996 | Linehan et al. . |
| 5,557,518 | 9/1996 | Rosen . |
| 5,621,797 | 4/1997 | Rosen . |
| 5,642,419 | 6/1997 | Rosen . |
| 5,671,279 * | 9/1997 | Elgamal .............................. 705/79 |
| 5,677,955 | 10/1997 | Doggett et al. . |
| 5,703,949 | 12/1997 | Rosen . |
| 5,715,314 * | 2/1998 | Payne et al. ......................... 705/78 |
| 5,724,424 * | 3/1998 | Gifford .............................. 705/79 |
| 5,757,917 | 5/1998 | Rose et al. . |
| 5,790,025 | 8/1998 | Amer et al. . |
| 5,790,677 | 8/1998 | Fox et al. . |
| 5,805,798 | 9/1998 | Kearns et al. . |
| 5,812,776 | 9/1998 | Gifford . |
| 5,822,737 * | 10/1998 | Ogram ............................... 705/26 |
| 5,825,881 | 10/1998 | Colvin, Sr. . |
| 5,826,242 | 10/1998 | Montulli . |
| 5,826,245 | 10/1998 | Sandberg-Diment . |
| 5,930,777 * | 7/1999 | Barber ............................... 705/40 |
| 5,974,146 * | 10/1999 | Randle et al. ....................... 380/24 |
| 5,991,750 * | 11/1999 | Watson ............................... 705/44 |
| 6,014,636 * | 1/2000 | Reeder ............................... 705/17 |
| 6,016,484 * | 1/2000 | Williams et al. .................... 705/39 |
| 6,023,682 * | 2/2000 | Checchio ............................ 705/18 |
| 6,029,150 * | 2/2000 | Kravitz .............................. 705/39 |
| 6,049,785 * | 4/2000 | Gifford .............................. 705/39 |
| 6,058,381 * | 5/2000 | Nelson ............................... 705/40 |

FOREIGN PATENT DOCUMENTS

WO 95/16971 * 12/1994 (WO) .
WO 95/16971 * 6/1995 (WO) .

OTHER PUBLICATIONS

Anderson et al., "Description of Financial Agent Secured Transactions (FAST) Authentication," Financial Technology Consortium, Fourth Draft, Dec. 2, 1998.*

O'Mahony, Donal, Peirce, Michael and Tewari, Hitesh, Electronic Payment Systems, Artech House, Inc., Norwood, MA, 1997.*

Anderson et al. Description of Financial Agent Secured Transactions Authentication.*

O'Mahony et al. Electronic Payment Systems, Artech House, Inc., Norwood, Ma, 1997.*

Milt Anderson et al., "Description of Financial Agent Secured Transactions (FAST) Authentication," Financial Services Technology Consortium, Fourth Draft, Dec. 2, 1998.

* cited by examiner

Primary Examiner—James P. Trammell
Assistant Examiner—Pierre E Elisca
(74) Attorney, Agent, or Firm—Joseph C. Redmond, Jr.; David M. Shofi; Morgan & Finnegan, LLP

(57) ABSTRACT

A method, system, program, and method of doing business are disclosed for electronic commerce that includes the feature of a "thin" consumer's wallet by providing issuers with an active role in each payment. This is achieved by adding an issuer gateway and moving the credit/debit card authorization function from the merchant to the issuer. This enables an issuer to independently choose alternate authentication mechanisms without changing the acquirer gateway. It also results in a significant reduction in complexity, thereby improving the ease of implementation and overall performance.

54 Claims, 10 Drawing Sheets

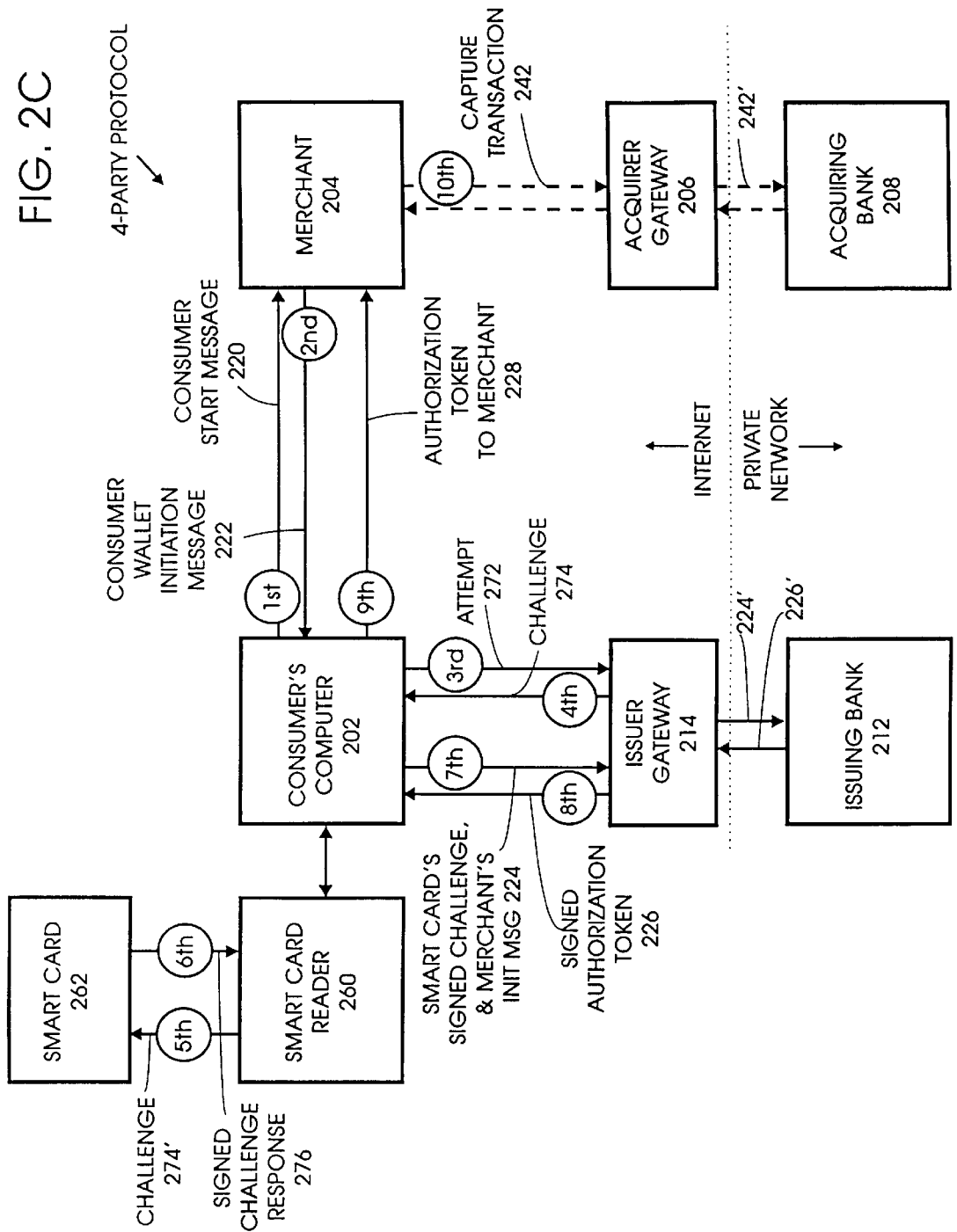

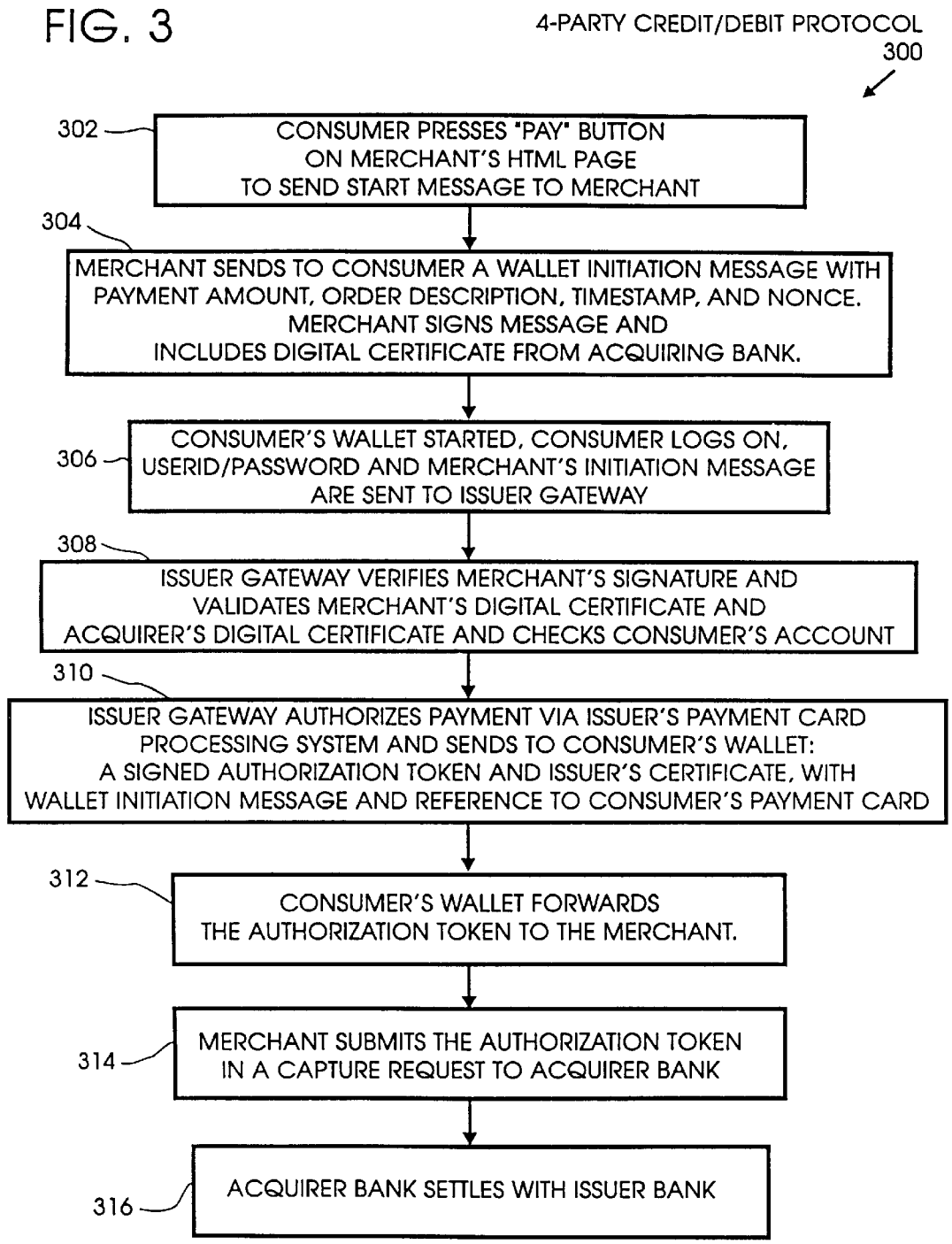

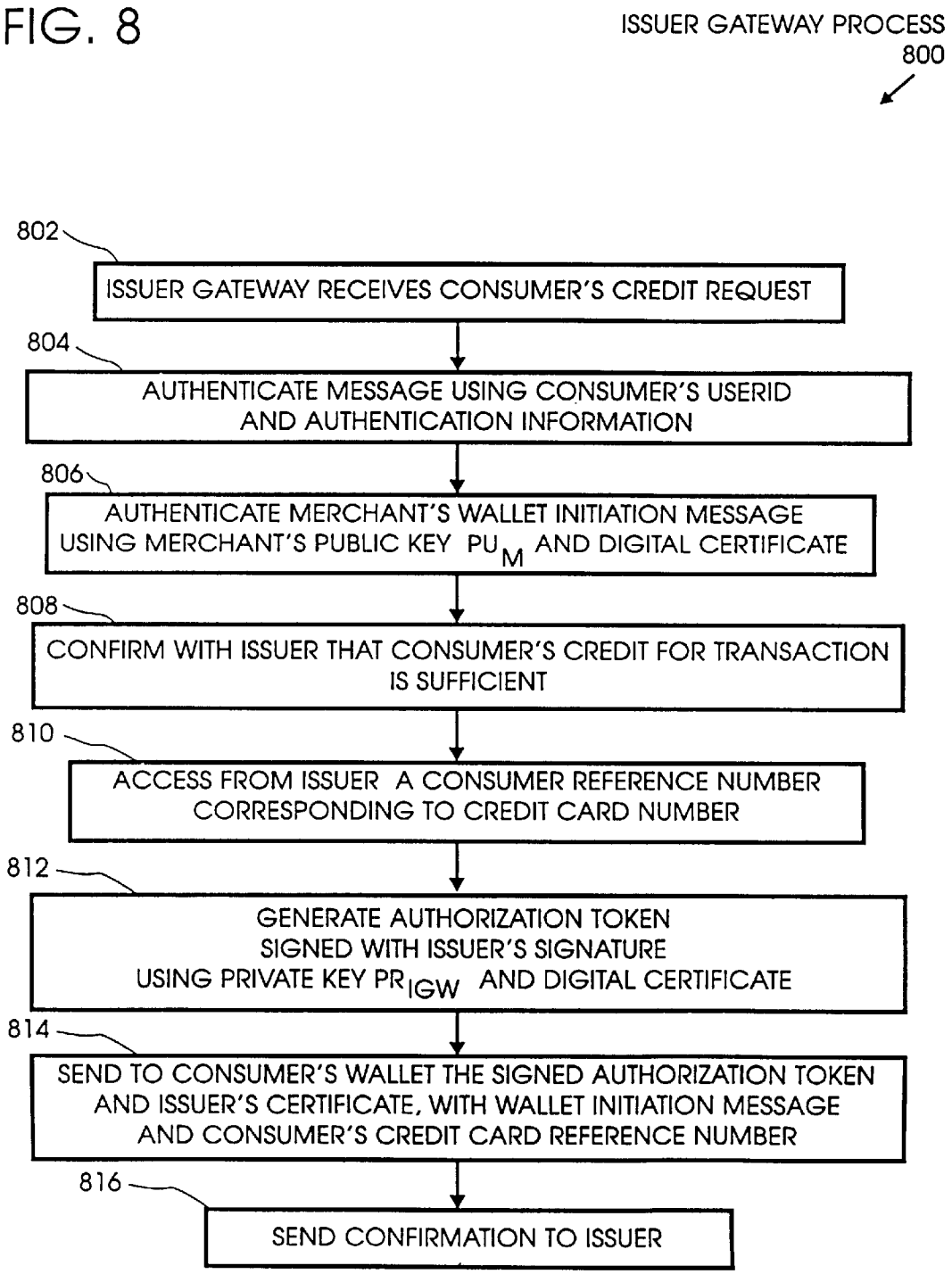

FOUR-PARTY CREDIT/DEBIT PAYMENT PROTOCOL

FIELD OF THE INVENTION

The invention disclosed broadly relates to computer networks and more particularly relates to electronic commerce.

BACKGROUND OF THE INVENTION

Electronic commerce is projected to grow at a high rate and this will have a significant impact on the financial industry. Estimates for 1998 are 700 million dollars worth of total revenues. Future growth promises $1 trillion by 2010. No financial institution will be left unaffected by the rapid growth of electronic commerce. One obstacle that can inhibit this growth, however, is the lack of secure electronic payments. Consumers and merchants are wary of transmitting their payment information over open networks such as the Internet and this caution affects the interest of merchants and financial institutions.

The technology of electronic commerce has adopted a number of terms that need to be defined in order to discuss the prior art and the invention. A short glossary of such terms follows.

- Acquirer—The financial institution (or an agent of the financial institution) that receives from the merchant the financial data relating to a transaction authorizes the transaction, obtains the funds from the issuer, and pays those funds into a merchant financial account. The acquiring institution can act as its own merchant certificate authority (MCA) or can contract with a third party for service.
- Authentication—In computer security, the process used to verify the identity of a user or the user's eligibility to access an object; verification that a message has not been altered or corrupted; a process used to verify the user of an information system or protected resources.
- Authorization—In payment card systems, the process used to verify that a credit or debit account is valid and holds sufficient credit or funds to cover a particular payment. Authorization is performed before goods or services are provided, in order to ensure that the cardholder credit can support payment.
- Browser—A computer program that allows a user to read hypertext messages such as HTML pages on the World Wide Web.
- Capture—In payment card systems, the process used by a merchant to claim payment from an issuing bank via an acquiring bank. Capture is performed after goods and services are provided. Optionally, capture may be combined with authorization in the case where goods or services are provided at the time of authorization.
- Cardholder—A person who has a valid payment card account and uses software that supports electronic commerce. Also known as a shopper, online shopper, consumer, or buyer.
- Certificate—A document issued by a trusted party that serves as physical evidence of the identity and privileges of the holder. Usually used as synonymous with an electronic certificate or digital certificate since an actual document is of little value in a world of electronic commerce.
- Certificate authority (CA)—an organization that issues certificates. The CA responds to the actions of a Registration Authority (RA) and issues new certificates, manages existing certificates, renews existing certificates, and revokes certificates belonging to users who are no longer authorized to use them.
- Certificate chain—a hierarchy of trusted digital certificates that can be "chained" or authenticated back to the "chain's" ultimate trust level—the top of the hierarchy called the "root certificate."
- Digital certificate—An electronic document digitally signed by a trusted party. The digital certificate binds a person's or entity's unique name to a public/private key pair.
- Digital signature—Data that is appended to, or is a cryptographic transformation of, a data unit. Digital signature enables the recipient of the data unit to verify the source and integrity of the unit and to recognize potential forgery.
- Digital wallet or Consumer wallet—Software that works like a physical wallet during electronic commerce transactions. A wallet can hold a user's payment information, a digital certificate to identify the user, and shipping information to speed transactions. The consumer benefits because his or her payment information is handled securely and because some wallets will automatically input shipping information at the merchant's site and will give the consumer the option of paying by digital cash or check. Merchants benefit by receiving protection against fraud. The wallet is used to protect and store credit/debit information, protect the transmission of that information to only the people that are authorized to see it and to authenticate the cardholder.
- Issuer—a financial institution that issues payment cards to individuals. An issuer can act as its own cardholder certificate authority (CCA) or can contract with a third party for the service.
- Key pair—In computer security, a matched set of public and private keys. When used for encryption, the sender uses the public key half to encrypt the message, and the recipient uses the private key half to decrypt the message. When used for signing, the signer uses the private key half to sign a message, and the recipient uses the public key half to verify the signature.
- Merchant server—a Web server that offers cataloged shopping services. The equivalent to a physical store.
- Password—For computer or network security, a specific string of characters entered by a user and authenticated by the system in determining the user's privileges, if any, to access and manipulate the data and operations of the system.
- Payment card—a credit card or debit card that is issued by a financial institution and shows a relationship between the cardholder and the financial institution.
- Registration authority (RA)—An organization or person authorized or licensed to authenticate a certificate requestor's identity and the services that the requester is then authorized to use. The RA approves requests so that certificates can be issued, renewed, updated, or revoked by a CA. The RA is usually a credit officer of an issuing or acquiring bank and approves the certificate requests for its members.
- Secure Sockets Layer—A security protocol that allows the client to authenticate the server and all data and requests to be encrypted. SSL offers a very limited trust model and a secure link between client and server.
- Thin wallet—generally the digital wallet program resides on the user's PC, but a "thin" wallet places some of the wallet function on a server, thereby reducing the program size on the user's PC and enabling an easier modification of the wallet's features.

Trusted Root—the base or top level certificate that provides the basis for the trusted hierarchy.

The prior art SET Secure Electronic Transaction™ (trademark and service mark owned by SET Secure Electronic Transaction LLC) protocol has been developed as a method to secure bankcard transactions over public networks. SET is an open standard, multi-party protocol for conducting secure bankcard payments over the Internet. SET provides message integrity, authentication of all financial data, and encryption of sensitive data.

SET is a 3-party protocol involving a cardholding consumer, a merchant, and a payment gateway operating on behalf of the acquiring bank, as shown in FIG. 1. When a consumer is ready to buy something from a merchant on the internet using a credit or debit card, the consumer's computer 102 sends a consumer payment request over internet path 120 to the merchant's computer 104, in a first step. The merchant's computer 104 forwards the consumer's payment request over internet path 122 during a second step to an acquirer gateway 106 operating on behalf of the acquirer bank 108. The acquirer gateway 106 passes the consumer's payment request to the acquirer bank 108 over a private network path 122'. The acquirer bank 108 sends the consumer's payment request to the card issuing bank 112 over the private network path 124 to check whether the consumer's credit or debit card account is active and sufficient for the proposed transaction with the merchant. The issuing bank 112, as the card issuer, authorizes the transaction in a message sent over private path 126 to the acquiring bank 108. The acquiring bank 108 sends the transaction authorization over private path 128' to the acquirer gateway 106, signing the message with the acquiring bank's digital signature. The acquirer gateway 106 forwards it over the internet path 128 to the merchant, authorizing the merchant to proceed with the transaction. Once the merchant has received the transaction authorization from the acquirer gateway 106, the merchant completes the sales transaction with the consumer. Then later, the merchant sends a message over internet path 142 to the acquirer gateway 106 to capture the transaction and get paid. The acquirer gateway then sends a payment message over path 144 to the merchant. The acquiring bank 108 may participate in some or all of the payment steps over private network paths 142' and 144'. Then, at the end of the business day, the acquiring bank will settle accounts with the issuing bank 112 over the private network.

Some implementors of SET are providing "thin" wallets, where all or some of the wallet function are implemented in server systems rather than in consumer-controlled machines. Where the wallet servers are run by issuing banks, it would be desirable to have the wallet servers directly authorize transactions before they are submitted to merchants. This would save the time and complexity required when the merchants obtain authorization from issuers through the merchant's acquiring banks. It would also be desirable to expand the cardholder authentication methods supported by the SET protocol, to enable an issuer to independently choose alternate authentication mechanisms without changing the acquirer gateway. As with any system, it would also be desirable to simplify the SET protocol in order to enable its easier implementation and to improve its overall performance.

SUMMARY OF THE INVENTION

The invention disclosed herein is a method, system, program, and method of doing business for electronic commerce that expands the role of a "thin" consumer's wallet by providing issuers with an active role in each payment. This is achieved by adding an issuer gateway and moving the credit/debit card authorization function from the merchant to the issuer. This enables an issuer to independently choose alternate authentication mechanisms without changing the acquirer gateway. It also results in a significant reduction in complexity, thereby improving the ease of implementation and overall performance.

The method of the invention includes the step of sending from a consumer's computer a start message over an internet network to a merchant's computer. The merchant's computer then replies to the consumer's computer with a merchant message including a wallet initiation message, a merchant digital signature, and a digital certificate from an acquiring bank. The wallet initiation message includes a payment amount, an order description, a timestamp, and a nonce. This starts a consumer's wallet program in the consumer's computer in response to the wallet initiation message. The consumer's computer then sends over the internet network some consumer identity and authentication information, such as a userid and user password, plus the merchant message, to an issuer gateway operating on behalf of an issuing bank.

The issuer gateway verifies the merchants signature to prove that the consumer is dealing with the actual merchant and validates the merchant's certificate and the acquirer's certificate to prove that the merchant and issuer share a common financial arrangement. The issuer gateway then verifies that the consumer's account is active and has sufficient funds and/or credit to support the payment amount. The issuer gateway then pre-authorizes payment by sending over the internet network an authorization token, an issuer's digital certificate, the wallet initiation message, and a reference value representing the consumer's credit or debit card number. The authorization token includes the payment amount, order description, timestamp, a random nonce plus a merchant identifier and the reference to the consumer's credit or debit card number. The issuer gateway signs the authorization token. This information can be sent either to the consumer or to the merchant to fulfill the order description. If sent to the consumer, the consumer forwards the authorization token to the merchant. The merchant verifies the issuer's signature, issuer's digital certificate, and authorization token contents to validate that the payment is authorized by the issuer.

Once the merchant has received the authorization token from the issuer gateway, the merchant completes the sales transaction with the consumer. Then later, the merchant sends a message, including the reference value representing the consumer's card number, over the internet to an acquirer gateway operating on behalf of an acquirer bank, to capture the transaction and get paid. The acquiring bank will settle accounts with the issuing bank over a private network by sending a settlement message that includes the reference to the consumer's card number. The issuing bank will convert the reference value into the consumer's card number and apply the transaction amount to the consumer's balance in his credit card or deposit account.

If the transaction is later disputed, the merchant can prove that the issuer authorized the payment by producing a copy of the authorization token. The combination of the issuer's signature on the authorization token, the issuer's digital certificate, and the contents of the authorization token provide undeniable proof that the issuer authorized the payment.

If privacy is desired, the communication among the consumer wallet, issuer gateway, and merchant can be protected via the Secure Socket Layer (SSL) protocol.

SET was designed for both Web and email use. The start and wallet initiation messages described above would not be used in an email implementation, however, the rest of the invention would not change. The contents of the wallet initiation message in an email implementation comes from another source, such as a CD-ROM, in which case, it could not be signed.

In this manner, a "thin" wallet is enabled for the consumer in an electronic commerce protocol that is significantly simpler than the SET protocol, and that pre-authorizes payments thereby improving overall performance and enabling greater flexibility for issuer in the authentication of cardholders.

Another feature of the invention is providing a financial institution's digital certificate containing a network address or URL that identifies the network location of the financial institution contacted via an internet network as part of a payment protocol. This can be applied to both the issuing bank and the acquiring bank. Many other features of the invention are also disclosed.

DESCRIPTION OF THE FIGURES

FIG. 2C illustrates the use of a consumer's smart card in the four-party protocol, in accordance with the invention.

FIG. 3 is a flow diagram of the four-party protocol, in accordance with the invention.

FIG. 8 is a flow diagram of the issuer gateway process in the four-party protocol, in accordance with the invention.

DISCUSSION OF THE PREFERRED EMBODIMENT

Figure 1:
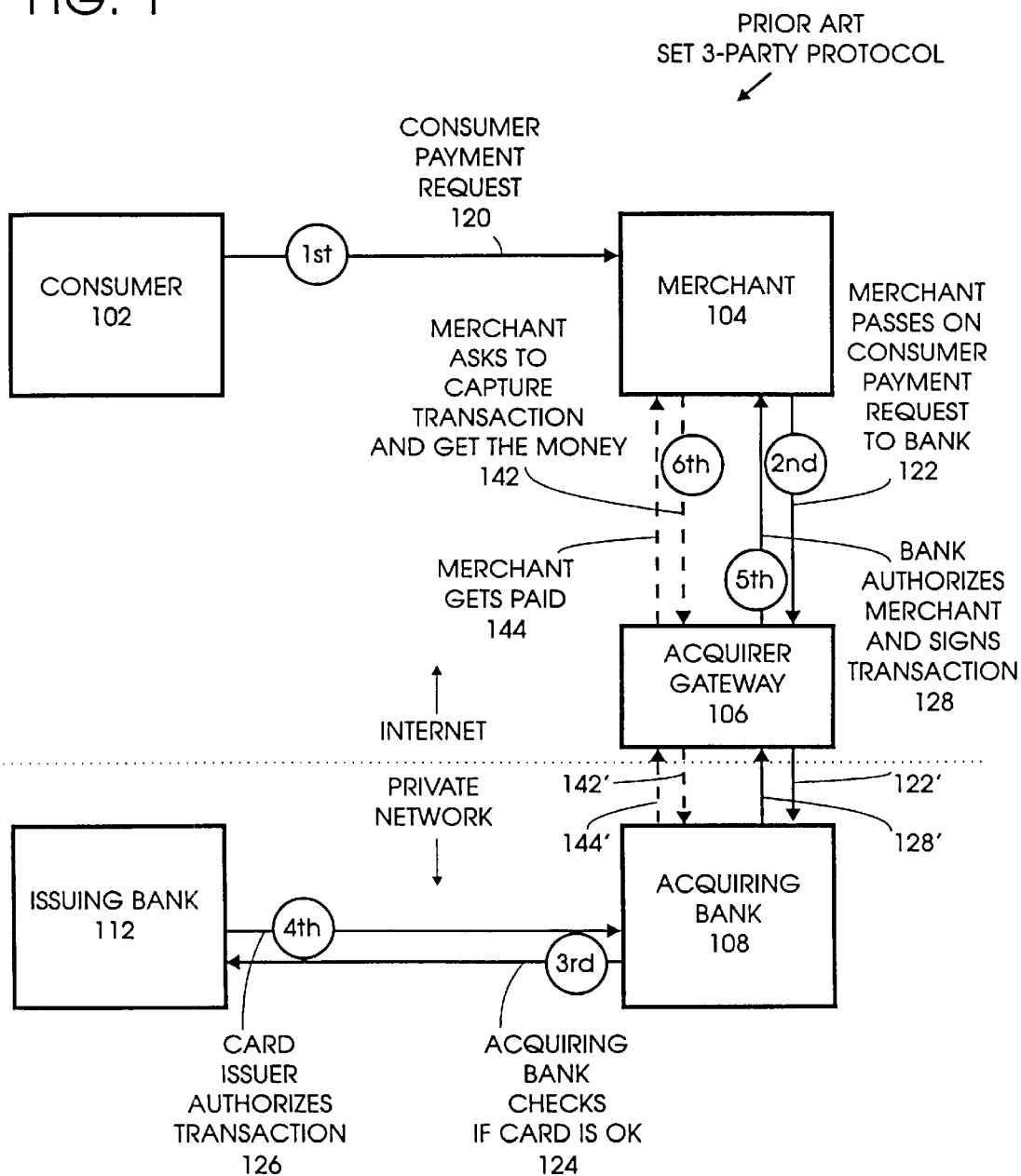
FIG. 1 illustrates the prior art SET three-party protocol.
Figure 2A:
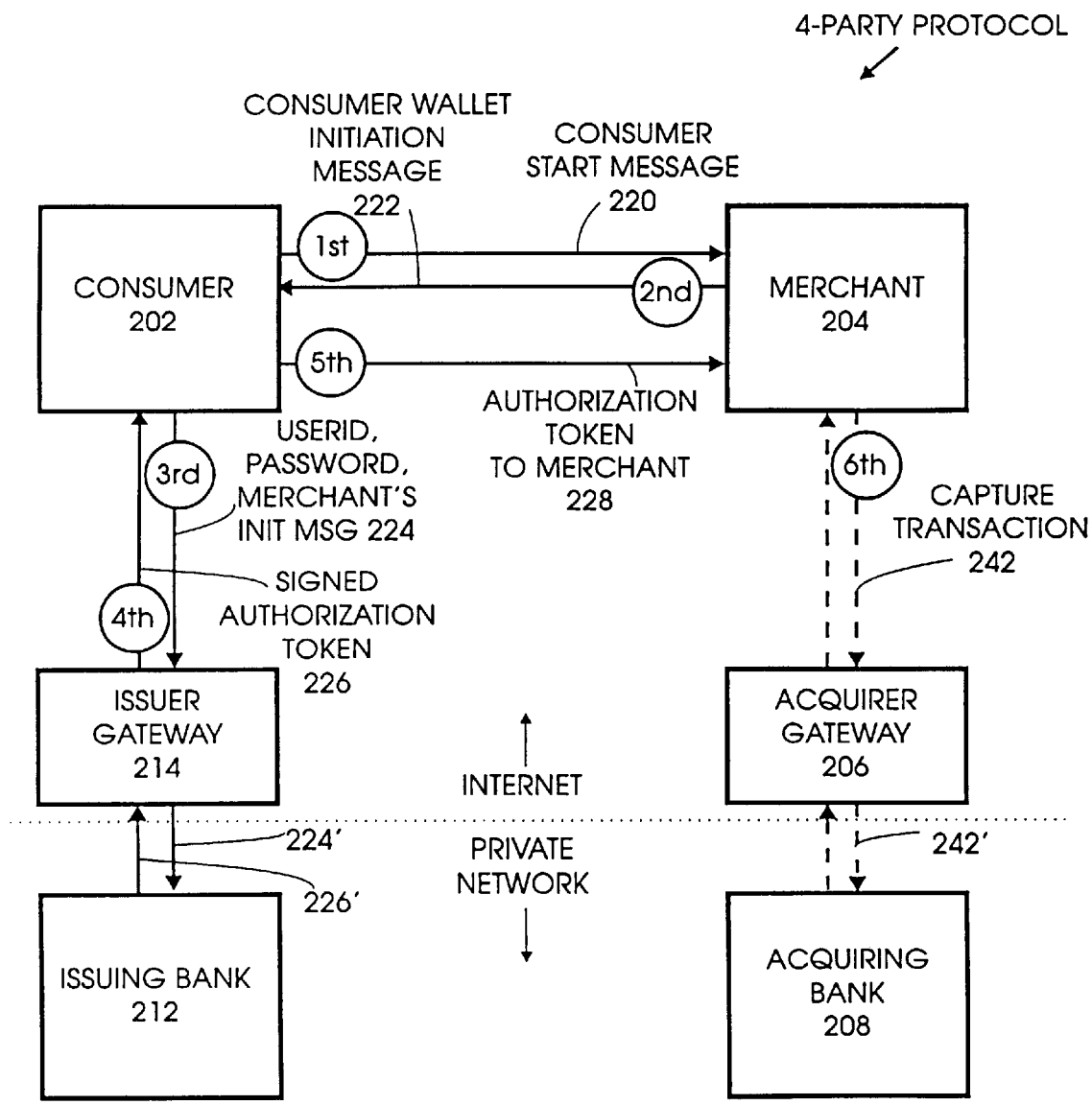
FIG. 2A illustrates the four-party protocol, in accordance with the invention.

FIG. 2A illustrates the four-party protocol, in accordance with the invention. A principal feature of the invention is providing an issuer gateway and moving the credit/debit card authorization function from the merchant to the issuer thus enabling pre-authorization of payments. The four-party protocol method of the invention includes the step of sending from a consumer's computer 202 a start message 220 over an internet network to a merchant's computer 204. The merchant's computer 204 then replies to the consumer's computer 202 with a merchant message 222 including a wallet initiation message, a merchant digital signature, and a digital certificate from an acquiring bank 208. The wallet initiation message includes a payment amount, an order description, a timestamp, and a nonce. This starts a consumer's wallet program in the consumer's computer 202 in response to the wallet initiation message. The consumer's computer 202 then sends a message 224 over the internet network including some consumer identity and authentication information, such as a userid and user password, plus the merchant message, to an issuer gateway 214 operating on behalf of an issuing bank 212.

The acquiring bank's digital certificate can contain a network address or URL that identifies the network location of the acquiring bank contacted via an internet network as part of a payment protocol.

Figure 2B:
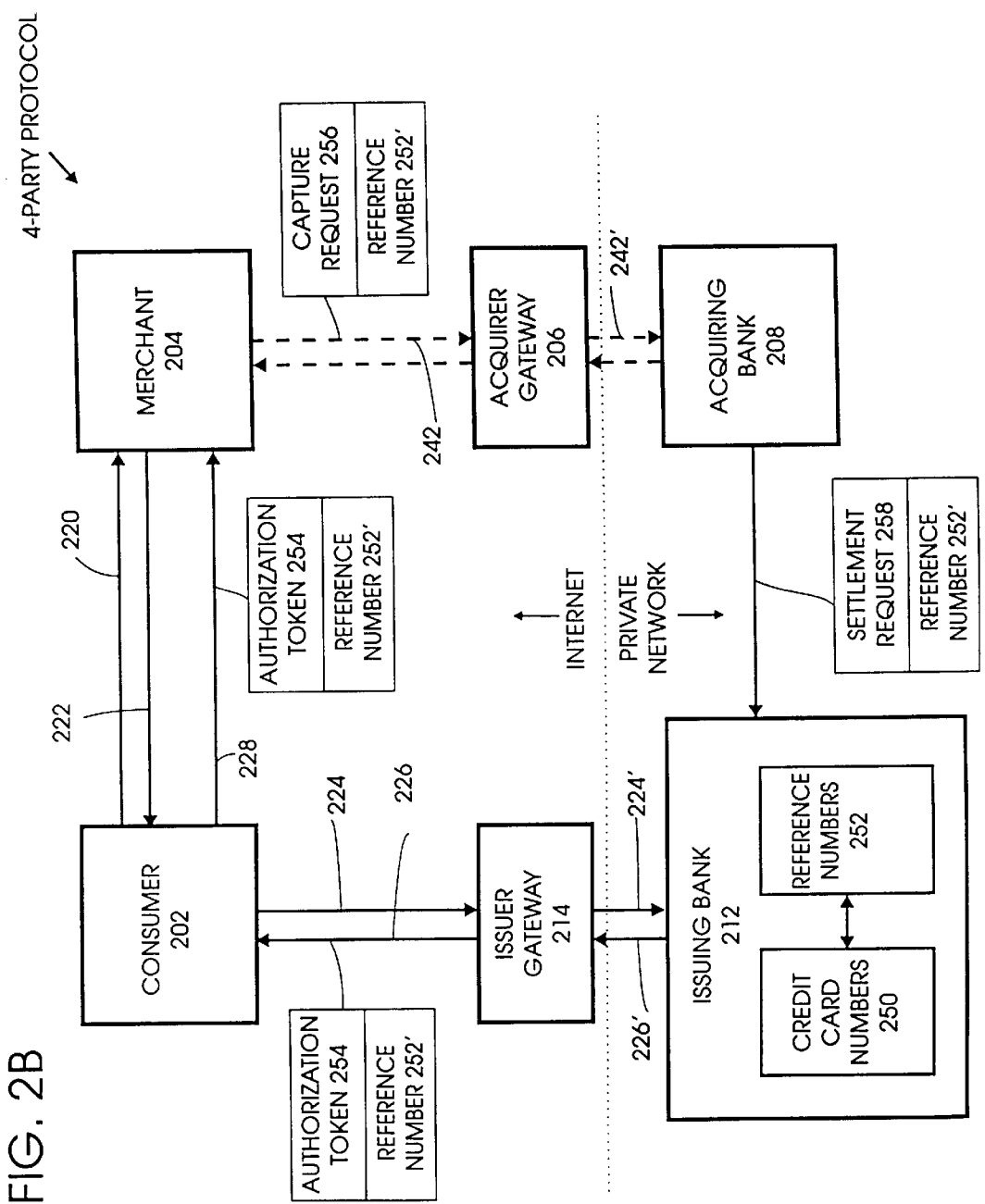
FIG. 2B illustrates the route of the authorization token in the four-party protocol, in accordance with the invention.
Figure 4:
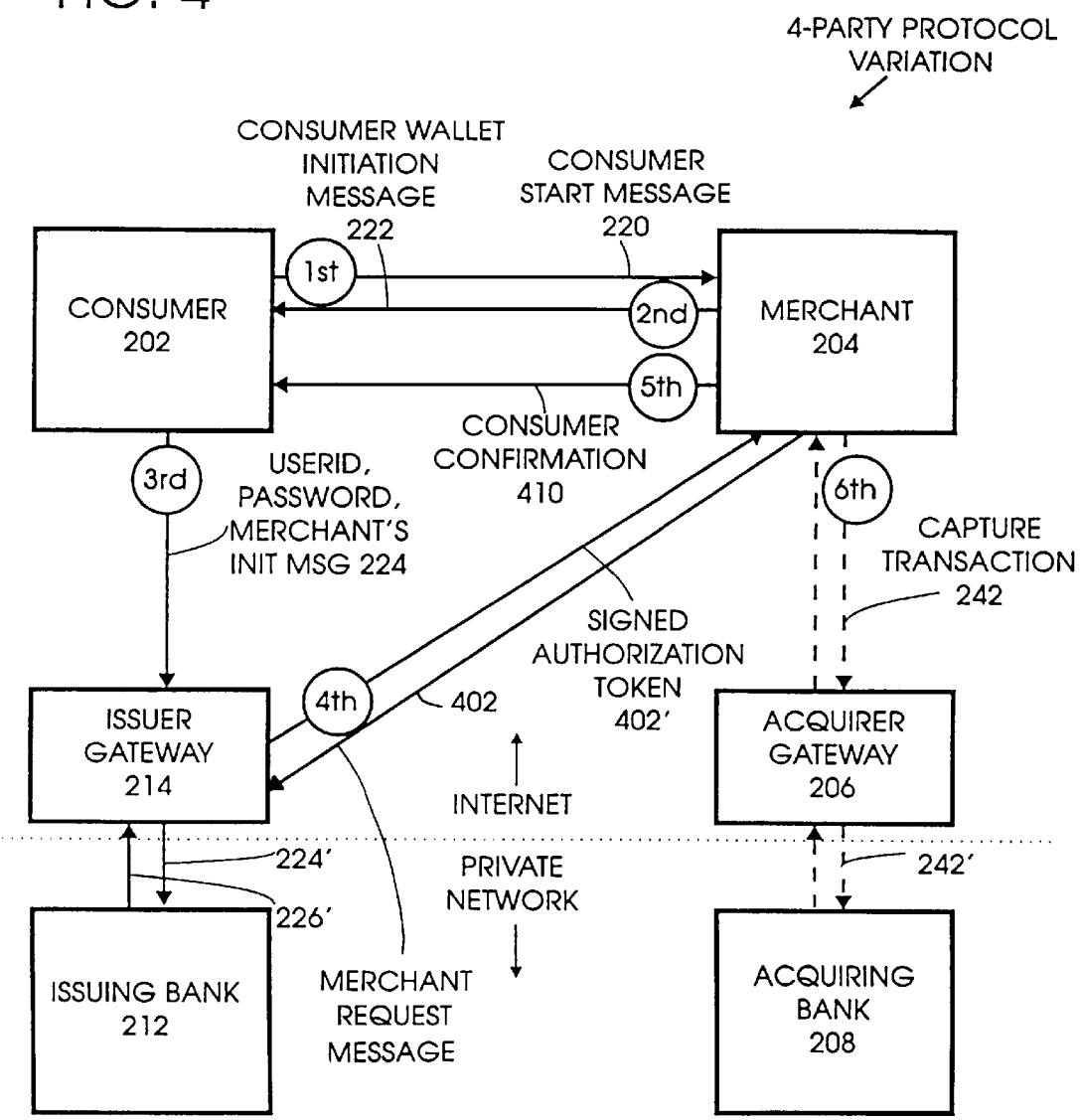
FIG. 4 illustrates a variation in the four-party protocol, wherein the signed authorization token is sent directly to the merchant, in accordance with the invention.

The issuer gateway 214 verifies the merchant's signature to prove that the consumer is dealing with the actual merchant and validates the merchant's certificate and the acquirer's certificate to prove that the merchant and issuer share a common financial arrangement. The issuer gateway 214 then verifies that the consumer's account is active and has sufficient funds and/or credit to support the payment amount. Then, as shown in FIG. 2B, the issuer gateway 214 then pre-authorizes payment by sending over the internet network an authorization token 254 over path 226, an issuer's digital certificate, the wallet initiation message, and a reference number or value 252' representing the consumer's credit or debit card number. The reference number 252' is created by the issuing bank 212, for example by preparing a table of credit card or debit card numbers 250 and a corresponding table of reference numbers 252. The issuing bank pairs the consumer's card number 250 with a selected reference number 252 and outputs the reference number over path 226' to the issuer gateway 214. The issuer gateway then includes the reference number 252' with the authorization token 254. The authorization token 254 includes the payment amount, order description, timestamp, a random nonce plus a merchant identifier and the reference number 252' to the consumer's credit or debit card number. The issuer gateway 214 signs the authorization token 254 on behalf of the issuing bank 212. This information can be sent either to the consumer 202 over path 226 as shown in FIG. 2B, or directly to the merchant 204 over path 402 as shown in FIG. 4, to fulfill the order description. If sent to the consumer 202 in FIG. 2B, the consumer forwards the authorization token 254 to the merchant 204 over path 228, as shown in FIG. 2B, the merchant 204 verifies the issuer's signature, issuer's digital certificate, and authorization token contents to validate that the payment is authorized by the issuer 212.

The issuing bank's digital certificate can contain a network address or URL that identifies the network location of the issuing bank contacted via an internet network as part of a payment protocol.

Once the merchant 204 has received the authorization token 254 from the issuer gateway 214, the merchant 204 completes the sales transaction with the consumer 202. Then later, the merchant 204 sends a capture request message 256 over path 242, including the reference number 252' representing the consumer's card number, over the internet to an acquirer gateway 206 operating on behalf of an acquirer bank 208, to capture the transaction and get paid. The acquiring bank 208 will settle accounts with the issuing bank 212 over a private network shown in FIG. 2B, by sending a settlement message 258 that includes the reference number 252' to the consumer's card number. The issuing bank 212 will convert the reference number 252' into the consumer's card number 250 and apply the transaction amount to the consumer's balance in his credit card or deposit account.

If the transaction is later disputed, the merchant 204 can prove that the issuer 212 authorized the payment by producing a copy of the authorization token 254. The combination of the issuer's signature on the authorization token, the issuer's digital certificate, and the contents of the authorization token provide undeniable proof that the issuer authorized the payment.

If privacy is desired, the communication among the consumer wallet, issuer gateway, and merchant can be protected via the Secure Socket Layer (SSL) protocol.

The invention can be applied to both the internet World Wide Web and to email use. The start message 220 and wallet initiation messages 222 described above would not be used in an email implementation, however, the rest of the invention would not change. The contents of the wallet initiation message in an email implementation comes from another source, such as a CD-ROM, in which case, it could not be signed.

In this manner, a "thin" wallet is enabled for the consumer in an electronic commerce protocol that is significantly simpler than the SET protocol, and that pre-authorizes payments, thereby improving overall performance and enabling greater flexibility for issuer in the authentication of cardholders.

FIG. 2C illustrates an example use of a consumer's smart card in the four-party protocol, in accordance with the invention. The smart card 262 owned by the consumer can be used to authenticate the consumer to the issuer gateway. When the consumer's computer 202 sends an attempt message 272 which attempts to connect with the issuer gateway 214, the issuer gateway responds to the consumer computer with a challenge message 274. The consumer computer 202 then passes the challenge on to the smart card reader 260, which passes it on as the challenge 274' to the smart card 262. The smart card 262 then signs the challenge with its digital signature and returns the signed challenge response 276 to the consumer's computer 202. The consumer's computer 202 then combines the signed challenge response 276 with the merchant's initiation message 224 and sends it on to the issuer gateway. The issuer gateway 214 verifies the smart card's signature and thus verifies the consumer's identity.

The invention includes the use of a variety of methods to perform authentication of the consumer with the issuer gateway 214. Examples include a userid and a password, an ATM debit card number and PIN, a smart card's account number and a symmetric Message Authentication Code (MAC), a smart card's account number and an asymmetric digital signature, a consumer's digital signature and digital certificate, a consumer's a user account number and a symmetric MAC or asymmetric digital signature, a user account number and an asymmetric digital signature, or a consumer's biometric signal. This wide choice of authentication methods between the consumer and the issuer gateway is possible because issuers have an active role in each payment. This enables an issuer to independently choose alternate authentication mechanisms without changing the acquirer gateway.

FIG. 3 is a flow diagram 300 of the four-party protocol, in accordance with the invention. It begins with step 302 where the consumer presses the "pay" button on the merchant's HTML internet browser page to send the start message to the merchant. Then in step 304, the merchant sends to the consumer the wallet initiation message with the payment amount, order description, timestamp, and nonce. The merchant signs the message and includes a digital certificate from the acquiring bank. Then in step 306, the consumer's wallet is started, the consumer logs on, and the user's identification and authentication information and the merchant's initiation message are sent to the issuer gateway. Then in step 308, the issuer gateway verifies the merchant's signature to prove that the consumer is dealing with the actual merchant and validates the merchant's certificate and the acquirer's certificate to prove that the merchant and issuer share a common financial arrangement. Then in step 310, the issuer gateway authorizes payment by sending over the internet network an authorization token, an issuer's digital certificate, the wallet initiation message, and a reference to the consumer's credit or debit card number. Then in step 312, the authorization token including the payment amount, order description, timestamp, a random nonce plus a merchant identifier and a reference to the consumer's credit or debit card number are forwarded to the merchant. Then later in step 314, the merchant submits the authorization token in a capture request to the acquirer bank. Then in step 316, the acquirer bank settles with the issuer bank.

FIG. 4 illustrates a variation in the four-party protocol, wherein the signed authorization token is sent directly to the merchant on path 402 and the merchant sends a confirmation message 410 to the consumer.

Figure 5:
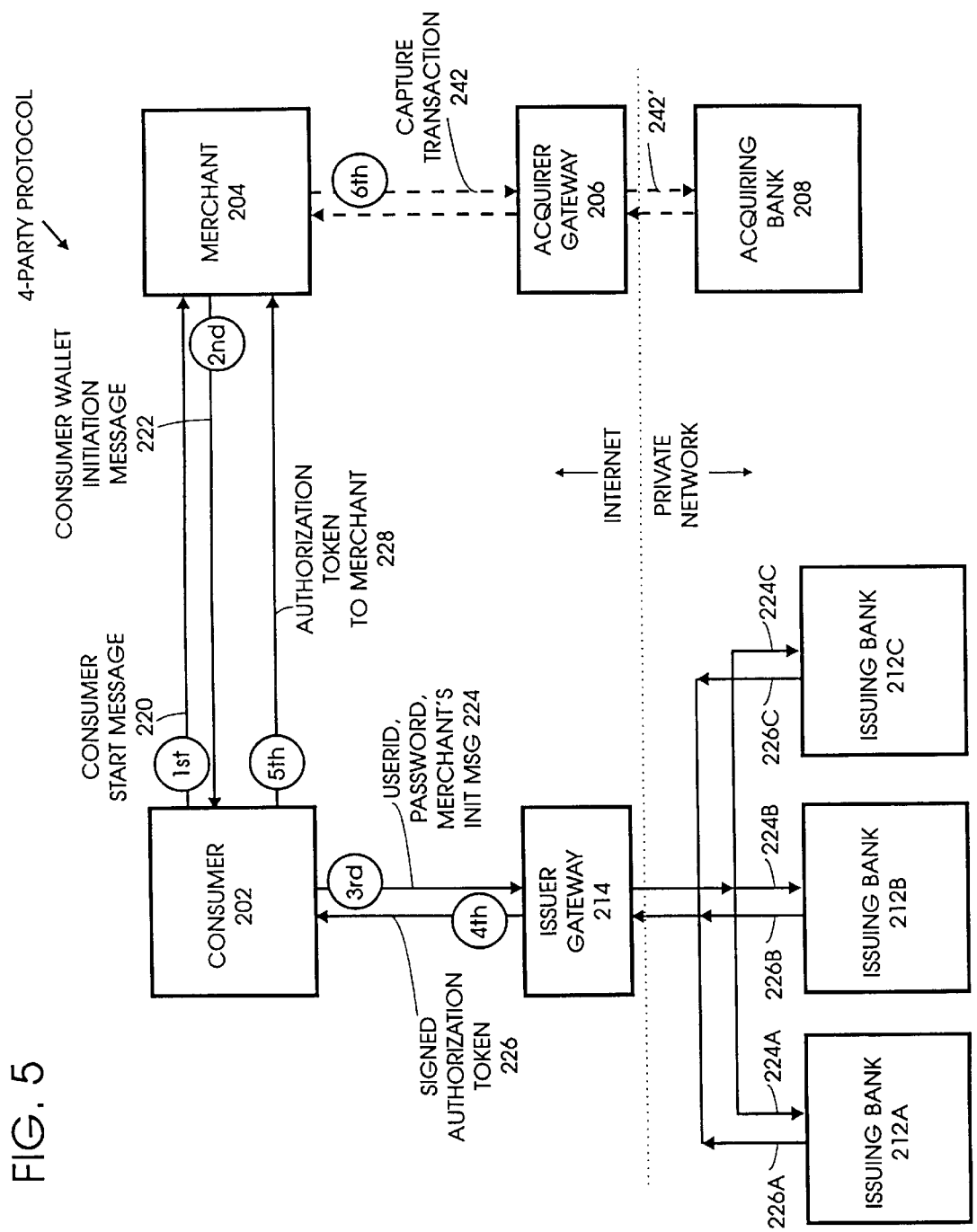
FIG. 5 illustrates the four-party protocol as applied to a plurality of issuing banks, in accordance with the invention.

FIG. 5 illustrates the four-party protocol as applied to a plurality of issuing banks, in accordance with the invention. Here a plurality of issuing banks 212A, 212B, and 212C can communicate over private networks with a common issuer gateway 214.

Figure 6:
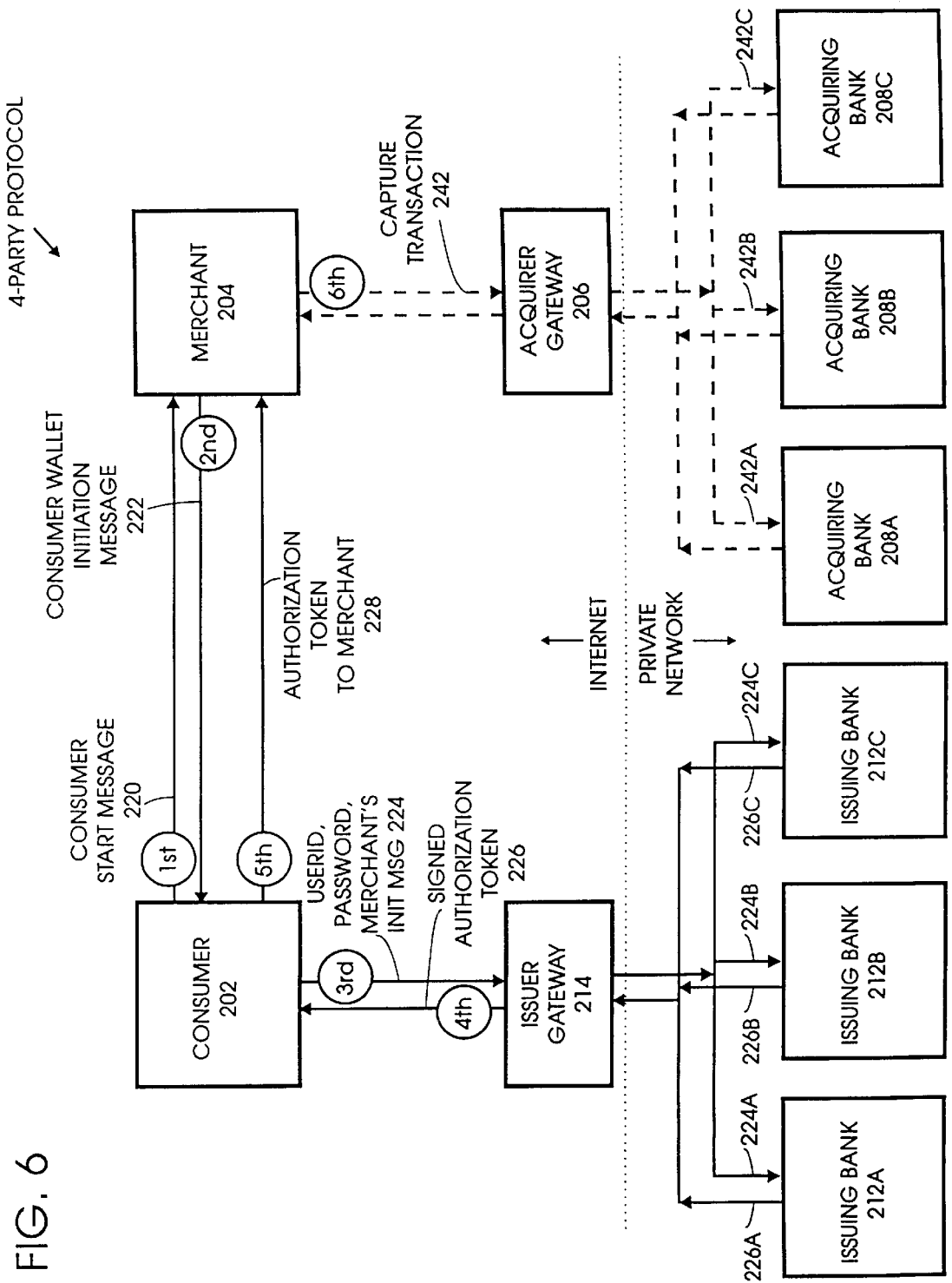
FIG. 6 illustrates the four-party protocol as applied to a plurality of issuing banks and a plurality of acquiring banks, in accordance with the invention.

FIG. 6 illustrates the four-party protocol as applied to a plurality of issuing banks and a plurality of acquiring banks. Here a plurality of issuing banks 212A, 212B, and 212C can communicate over private networks with a common issuer gateway 214 and a plurality of acquiring banks 208A, 208B, and 208C can communicate over private networks with a common acquirer gateway 206.

Figure 7:
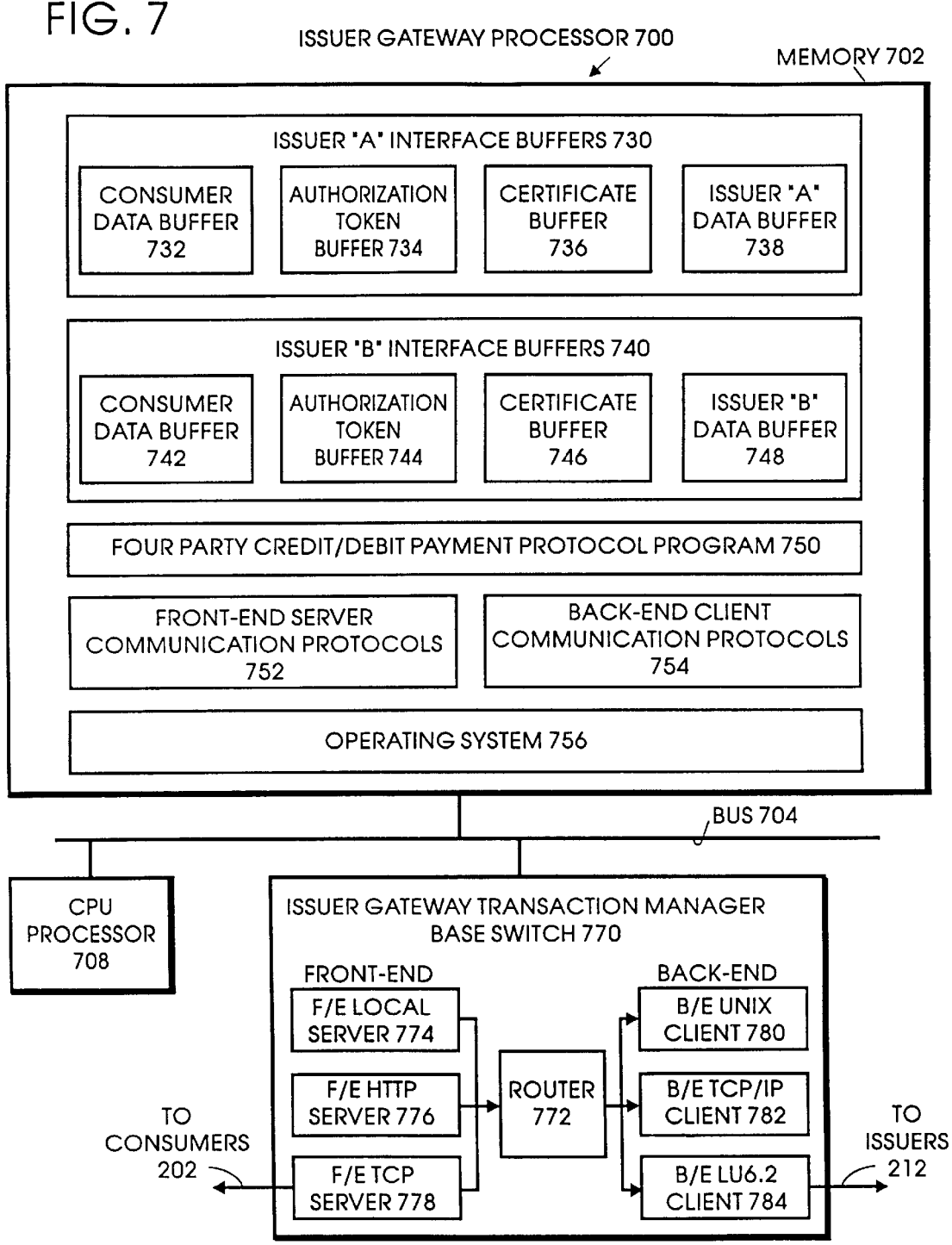
FIG. 7 illustrates the issuer gateway processor, in accordance with the invention.

FIG. 7 illustrates the issuer gateway processor, in accordance with the invention. the processor 700 includes a memory 702, a bus 704, a CPU processor 708, and an issuer gateway transaction manager base switch 770. The base switch 770 includes a front-end that includes a front-end local server 774, a front-end HTTP server 776, and a front-end TCP server 778. The base switch 770 includes a back-end that includes a back-end UNIX client 780, a back-end TCP/IP client 782, and a back-end LU6.2 client 784. A router 772 connects the front-end to the back-end. The front-end is connected to consumers 202 and the back-end is connected to issuers 212. The memory 702 includes issuer "A" interface buffers 730, issuer "B" interface buffers 740, the four-party credit/debit payment protocol program 750, front-end server communication protocols 752, back-end client communication protocols 754, and the operating system 756. The programs stored in the memory 702 are sequences of executable instructions which when executed in the CPU 708 perform the methods of the invention.

FIG. 8 is a flow diagram 800 of the issuer gateway process in the four-party protocol, in accordance with the invention. In step 802, the issuer gateway receives the consumer's payment request. Then step 804 authenticates the message using the consumer's authentication information. Then step 806 authenticates the merchant's wallet initiation message using the merchant's public key and digital certificate. Then step 808 confirms that the consumer's credit or deposit is sufficient for the transaction. Then step 810 accesses from the issuer a consumer reference number corresponding to the credit consumer's card number. Then step 812 generates an authorization token signed with the issuer's signature using a private key and digital certificate. Then step 814 sends to the consumer's wallet the signed authorization token and the issuer's certificate, with the wallet initiation message and the consumer's card reference number. Then step 816 sends a confirmation to the issuer.

The resulting invention has many advantages. It fits well with server-based (thin) wallets (which would operate in the issuer gateways). It separates the authentication technology used between the consumer and issuing bank from the remainder of the payment protocol. It permits each issuing bank to determine how it will authenticate its consumers (e.g. userid/password, symmetric or asymmetric keys with or without digital certificates or smart cards, other security hardware). It avoids the use of digital certificates for consumers. It pre-authorizes payments, eliminating the cost and delay of real-time authorization through the private network between the acquirer and the issuer. It reduces overhead for merchant and payment gateway, since payments are authorized before they reach the merchant, and since much less cryptography is required. It provides protection for the credit or debit card number, without using encryption. It complies with U.S. export laws and foreign cryptography usage laws by not using any encryption. It has potential for lower development and testing costs (compared to SET) because of a simpler design. Examples of the simpler design include avoidance of encryption; elimination of the requirement for consumer certificates; and avoiding any requirement for the consumer wallet to validate certificates, generate digital signatures, or verify digital signatures. The invention supports Japanese Payment Options and other issuer-based payment features in a manner simpler than SET.

A more detailed discussion of the protocol steps follows:

1. In FIG. 2A, path 220, the Consumer uses a browser to shop at a merchant WWW site. Consumer presses a "pay" button on merchant's HTML page, or otherwise indicates consumer is ready to make a payment.

II. In FIG. 2A, path 222, the Merchant sends a wallet initiation message to the consumer, containing payment amount, order description, timestamp, a random nonce, and possible additional data depending upon requirements. The merchant signs this initiation message and includes a digital certificate provided by the acquiring bank.

3. In FIG. 2A, path 224, the Wallet initiation message causes consumer's browser to start consumer's wallet. Consumer is prompted to logon to the wallet using userid/password, smartcard, or other appropriate authentication mechanism. Wallet sends data from step 1, plus consumer's identity and authentication data to the issuer gateway.

4. In FIG. 2A, path 226, the Issuer gateway verifies the merchant's signature and digital certificate to validate that the merchant and issuer share a common financial arrangement established by national law or a financial association such as MasterCard, Visa, an ATM network, or similar organization. Issuer gateway authorizes payment via issuer's card processing system. Issuer gateway generates and sends a signed authorization token to the consumer wallet, along with the issuer gateway's certificate. The authorization token contains the data from step 1 plus a merchant identifier and a reference to the consumer's credit card number. The "reference" is discussed below in more detail.

Note that the authorization token is "bound" to the particular payment by the reference to the consumer's credit card number, merchant identifier, payment amount, timestamp, and nonce. This means that a specific authorization token is good for just one payment.

5. In FIG. 2A, path 228, the consumer's wallet forwards the authorization token to the merchant, which can verify both the issuer gateway's signature and the data in the authorization token. No separate realtime authorization is required since the payment is "pre-authorized" before it reaches the merchant.

6. In FIG. 2A, path 242, at some later time, the merchant submits the authorization token in a capture request to the acquirer's payment gateway. The capture request tells the acquirer to actually post the charge to the consumer's credit or debit account. Confidentiality of these messages can be obtained, if desired, by transmitting them within SSL sessions. The integrity and authenticity of the messages does not depend upon SSL so that the messages can be used both to authorize ongoing processing steps, and to provide proof that the transactions occurred.

Note that the consumer wallet software necessarily provides very little function in this design. Most of the payment protocol function is performed in the issuer gateway. At minimum, the wallet provides some method of authenticating the consumer to the issuer gateway, as discussed below. If consumer wallets are shared among issuers, then the authentication scheme must be shared, but the authentication data (e.g. smart card) could be different for each issuer. If consumer wallets are not shared among multiple issuers, as shown in FIG. 5, then the authentication mechanism (smart card, userid/password) could be different for each issuer.

The consumer wallet must provide payment request timeout and retry functions. Most other functions can be placed in either the consumer wallet or the issuer gateway. These include most of the user interface, the payment inquiry function, the payment transaction log, support for multiple consumer cards, and support for payment selection. Implementing these functions at the consumer machine would result in a "fat" wallet; implementing them in the issuer gateway would result in a "thin" wallet.

Message processing functions (parsing and checking incoming messages, generating complex outgoing messages) are much simpler than in SET, since no encryption is used; the wallet need not examine the merchant's data in step 1 and the authorization token from step 2; and the wallet neither generates nor verifies signatures.

The merchant, acquirer gateway, and issuer gateway should implement replay detection both to handle error retries and to defend against malicious replay attacks.

Reference to Credit/Debit Card Number

At step 4, the issuer gateway includes a "reference" to the consumers card number in the authorization token. If the actual card number were used, the authorization token—or at least the card number—would have to be encrypted in steps 3, 4, and 5. Instead, the 4-party protocol uses a "reference", which can be composed in either of the following ways:

a. The reference is an "alias card number", meaning a secondary account number that is mapped at the issuing bank to the real card number. This is similar to an approach discussed (and rejected) during the SET design, and actually used in the X9.59 ANSI draft. The alias card number is only used for Internet-based transactions that are accompanied by an authorization token. A stolen alias card number has no use without an authorization token, so it does not entail any risk to real-world credit cards.

b. The reference is an authorization number allocated uniquely by the issuer gateway for each authorization. This authorization number is passed by the acquirer gateway back to the issuing bank in the capture message. The issuing bank maintains a database mapping authorization numbers to card numbers. When the issuing bank receives the capture message, it uses this database mapping to determine the actual card number.

To support this design, the authorization token would include a dummy card number for use in routing the payment to the appropriate issuer. This dummy card number could be shared among all cardholders using this 4-party protocol. Either of these alternatives can support interfacing to the existing capture networks that interconnect acquiring and issuing banks.

Certificate Hierarchy

The 4-party protocol is supported by a certificate hierarchy that covers issuing banks, acquiring banks, and merchants. The certificate hierarchy is used with standard asymmetric (public-key) digital signatures to identify the protocol participants to each other. The certificates represent the common financial agreements and obligations among these parties. In particular, the issuing bank certificates identify and help authenticate issuing banks to merchants, providing a basis for the merchants to trust the authorization tokens provided by the issuing banks. The acquiring bank and merchant certificates identify and help authenticate the corresponding participants to issuing banks. This serves several purposes: (a) identifies the merchant to the consumer; (b) verifies that the merchant is a valid participant of the payment scheme before the issuing bank provides an authentication token; (c) helps deter some forms of attack on issuing banks by requiring participation of both a consumer and merchant in an attack. The certificate hierarchy is illustrated in the following Table I:

TABLE I

| Certificate Type | Purpose | Issuing Party | Relying Parties |
| --- | --- | --- | --- |
| Root | Provide trust base for entire protocol | Root (self) | All |
| Issuing bank | Identify & help authenticate valid issuing banks to merchants. | Root | Merchant, Acquiring bank |
| Acquiring bank | Identify and help authenticate valid acquirers to issuing banks and consumers. | Root | Issuing bank, consumer |
| Merchant | Identify and help authenticate valid merchants to issuing banks and consumers. | Acquiring Bank | Issuing bank, consumer |

Consumer certificates are not required, since the consumer authenticates to the consumer's own issuing bank. The consumer and bank have a long-term established relationship, so the bank can keep a data base containing the symmetric or asymmetric key required to authenticate the consumer.

X.509 or other established digital certificate formats are used. Each certificate identifies the certificate owner by name, physical address, network address, and so forth. In particular, the issuing gateway's certificate should contain the issuing gateway's network address to support split, recurring, and installment payments as described below. The merchant's certificate should contain the merchant's name, address, and contact information to assist in dispute resolution. The merchant's certificate should identify the acquiring bank that holds the merchant's business account used to settle payments.

The certificate hierarchy must be rooted by an authority jointly trusted by the banks. The root could be run by individual credit or debit brand associations, such as MasterCard, Visa, or the ATM network associations; by a national regulator such as the Federal Reserve; or by an international organization such as the WTO or World Bank. The choice of who runs the root is associated with the question of who establishes and enforces the business and regulatory arrangements between the issuing and acquiring banks. If national or international commercial laws define these arrangements (as with paper checks), then a public organization would be appropriate. If private bilateral or multi-lateral banking contracts define these arrangements, then financial associations (such as MasterCard or Visa) might operate the root. The organization of the certificate hierarchy should reflect the business arrangements. Possible arrangements could include separate hierarchies for separate countries or financial associations (e.g. one hierarchy for Visa, and another for MasterCard); a shared hierarchy as with SET (e.g. an industry root that grants certificates to sub-trees for financial associations or countries); or other variations.

Consumer Authentication

An advantage of this design is the fact that the issuing bank can choose the technology used to authenticate the consumer to the issuer gateway. Possibilities include many standard techniques common in the industry:

Userid and password, for example as provided by basic authentication in standard WWW browsers.

Account number and ATM PIN.

Software- or smart card-based symmetric or asymmetric authentication, where the issuer gateway obtains matching key verification information from a database.

Asymmetric authentication using digital certificates, for example using SSL v3 as implemented in WWW browsers. This could be implemented using either software or smart cards.

Proprietary hardware tokens.

Biometrics.

End-user authentication involves a complex trade-off between cost, security, risks, portability and end-user convenience. Furthermore, the trade-offs change over time as new user authentication technology is invented. Unlike SET, the 4-party protocol design allows individual issuing banks to make their own choices for their customers, independently of the digital certificate technology used to authenticate merchants to issuers, and banks to each other.

Split Shipments, Recurring Payments, and Installment Payments

SET provides the following features:

Split shipments support merchants who must back-order merchandise.

The merchant can divide a payment into two or more portions that are separately authorized and settled, without consumer interaction.

Recurring payments support merchandising schemes such as monthly newspaper subscriptions. The merchant can authorize and capture payments on a regular schedule, given initial consumer approval and without further consumer involvement.

Installment payments permit consumers and merchants to stretch a payment over time. At the time of a purchase the consumer and merchant agree to a particular schedule and the merchant or acquiring bank then automatically authorize and capture payments according to the schedule Split shipments are supported in the 4-party protocol by an additional message interaction between the merchant and issuer gateway, as shown in FIG. 4. When the merchant discovers that it needs to split a shipment, it sends the authorization token from step 3 to the issuer gateway identified in the issuer's digital certificate. This is a message merchant request on path 402 of FIG. 4. The merchant includes the details of the split requirement, such as the amount of the first payment. The merchant authenticates the request by signing it and including the merchant's digital certificate. The issuer gateway can verify that the merchant signing message is the same merchant that signed the merchant request message. The issuer gateway verifies the split request according to its business and risk management policies, and responds with a new authorization token in a message on path 402 of FIG. 4. Consumer confirmation of split shipments is sent on pad 410 in step S. In step 6, the merchant forwards the new authorization token in the capture message on path 242 of FIG. 4 to the acquirer gateway. This message is the same message as in the basic protocol design. The merchant resubmits the new authorization token in a second message on path 242 of FIG. 4, whenever the merchant has shipped the second part of the shipment. If the merchant needs to further split the shipment, then messages on paths 402 and 242 of FIG. 4 can be repeated as needed.

The 4-party protocol can support recurring and installment features by a combination of additional information in the authorization token, and messages on paths 402 and 242 of FIG. 4. Specifically, the steps of the basic protocol are modified as follows:

1. The wallet initiation message contains additional parameters that identify the terms of any recurring or installment payment agreed between the merchant and consumer.
2. The wallet should display these terms to ensure consumer awareness and agreement. The wallet forwards the additional parameters to the issuer gateway.
3. Issuer gateway verifies that the recurring or installment terms are acceptable according to the issuer's business and risk management policies. The issuer gateway includes the terms as additional parameters in the authorization token.
4. The consumer's wallet forwards the authorization token (with additional parameters) to the merchant as in the basic protocol, in the message on path 228 of FIG. 2A.
5. The capture of the first installment or recurring payment occurs as with the basic protocol, in the message on path 242 of FIG. 2A.
6. The merchant authorizes the second and subsequent installment or recurring payments by sending the message on path 402 of FIG. 4 to the issuer gateway. The additional parameters in the authorization token allow the issuer gateway to recognize and appropriately handle these special payment types. The issuer gateway returns a new authorization token in another message on path 402 prime of FIG. 4 that can be used both for captures (in a message on path 242 of FIG. 4) and further authorizations by repeating messages on path 402 of FIG. 4 as required.

Japanese Payment Options

SET supports a special business arrangement that is common in Japan. Issuing banks and merchants attract customers and business by offering installment and other payment arrangements that are managed by the banks rather than the merchants, This involves a very complex protocol among all the SET participants.

The 4-party protocol facilitates this feature because the consumer wallet and issuer gateway directly interact. Specifically, at step 4 of the protocol on path 226 of FIG. 2A, the issuer could offer special payment arrangements to the consumer. These arrangements could be conditioned on the merchant name (from the merchant's digital certificate), the amount of payment (from the initiation message), or other data supplied by the merchant in the initiation message. The remaining steps of the 4-party protocol can operate unchanged from the base design. This considerably simplifies the JPO protocol support (compared to SET), while providing an opportunity for issuers to differentiate themselves and attract consumer business.

Protocol Flow Variation

Many variations of this 4-party design are possible. A principle one is shown in FIG. 4. This variation has the same four steps as the basic design, but the authorization token is sent directly from the issuer gateway to the merchant. Specifically:

1. In FIG. 4, path 220, the Consumer uses a browser to shop at a merchant WWW site. Consumer presses a "pay" button on merchant's HTML page, or otherwise indicates consumer is ready to make a payment. In step 2, the Merchant sends a wallet initiation message to the consumer, containing payment amount, order description, timestamp, a random nonce, and possible additional data depending upon requirements. The merchant signs this initiation message and includes a digital certificate provided by the acquiring bank.
33. In FIG. 4, path 224, the Wallet initiation message causes consumer's browser to start consumer's wallet. Consumer is prompted to logon to the wallet using userid/password, smartcard, or other appropriate authentication mechanism. Wallet sends data from step 1, plus consumer's identity and authentication data to the issuer gateway.
4. In FIG. 4, path 402, the Issuer gateway verifies the merchant's signature and digital certificate to validate that the merchant and issuer share a common financial arrangement established by national law or a financial association such as MasterCard, Visa, an ATM network, or similar organization. Issuer gateway authorizes payment via issuer's credit card processing system. Issuer gateway generates and sends a signed authorization token directly to the merchant, along with the issuer gateway's certificate. The authorization token contains the data from step 1 plus a merchant identifier and a reference to the consumer's credit card number, as with the base protocol.

Note that the authorization token is "bound" to the particular payment by the reference to the consumer's credit card number, merchant identifier, payment amount, timestamp, and nonce. This means that a specific authorization token is good for just one payment.

5. In FIG. 4, path 402, the merchant verifies both the issuer gateway's signature and the data in the authorization token. No separate realtime authorization is required since the payment is "pre-authorized" before it reaches the merchant. Merchant sends acknowledgement back to issuer gateway.
5. In FIG. 4, path 224, the Issuer gateway sends acknowledgement back to the consumer wallet, which terminates so that normal browsing can proceed.

6. In FIG. 4, path 242, at some later time, the merchant submits the authorization token in a capture request to the acquirer's payment gateway. The capture request tells the acquirer to actually post the charge to the consumer's credit or debit account.

The difference between this and the base design is that the issuer gateway sends the authorization token directly to the merchant, instead of relaying it through the consumer wallet. The primary advantage of this design is that it matches a "thin" wallet design by moving responsibility for error recovery to the issuer gateway. The disadvantage is that the consumer wallet (and hence the consumer) has less opportunity to be aware of the progress of the payment.

The principle of operation of the invention applies to both non-interactive internet communications such as email, as well as to interactive applications such as the World Wide Web. The method of the invention includes the step of sending from a consumer's computer to an issuer gateway for an issuing bank, an authorization request message containing consumer identity and authentication information, payment amount, an order description, a timestamp, a digital certificate representing a merchant, and a digital certificate representing the merchants acquiring bank. Then the method continues with the merchant's digital certificate containing a merchant identifier unique for the acquiring bank. Then the method continues with the acquiring bank's digital certificate containing a bank identifier unique among all banks sharing a common financial arrangement. Then the method continues with the step of validating at the issuer gateway the merchant's certificate and the acquirer's certificate to prove that the merchant, acquirer, and issuer share a common financial arrangement. Then the method continues with the step of the issuer gateway verifying the consumer's account and ensuring that funds and/or credit are available to support the payment amount, then authorizing payment by sending over the internet network an authorization token, an issuer's digital certificate, and a reference to the consumer's credit or debit card number. Then the method continues with the authorization token including the payment amount, order description, timestamp, a random nonce, the merchant identifier from the merchant's digital certificate, and the acquiring bank identifier from the acquiring bank's digital certificate, plus a reference to the consumer's credit or debit card number. Then the method continues with the authorization token being digitally signed by the issuing bank. Then the method continues with the step of the merchant's computer receiving the authorization token and fulfilling the order description.

The method can include the feature of sending from a merchant's computer over an internet network to a consumer's computer, a merchant message including a wallet initiation message, a merchant digital certificate, and a digital certificate from an acquiring bank, the wallet initiation message including a payment amount, an order description, and a timestamp. Then the method starts a consumer's wallet program in the consumer's computer in response to the wallet initiation message. Then the consumer's wallet program sends the authorization request message.

The method can include the feature of including with the wallet initiation message a merchant's digital signature of the wallet initiation message, including the wallet initiation message and the merchant's digital signature in the authorization request message, and verifying at the issuer gateway the merchant's signature to prove that the consumer is dealing with the actual merchant.

The merchant's computer can perform the steps of receiving the authorization token, verifing the issuer's signature, digital certificate, the payment amount and merchant identity in the authorization token, verifying the freshness of the authorization token via the timestamp in the token, using the nonce in the authorization token to recognize duplicate tokens, and fulfilling the order description.

The merchant can claim payment through the acquiring bank by forwarding the customer reference number and payment amount to the acquiring bank. In the case of a subsequent dispute, the merchant proves payment authorization by submitting a copy of the authorization token and issuer's digital certificate to the acquiring bank. The acquiring bank verifies the issuer's signature on the authorization token, validates the issuer's digital certificate, checks for duplicates via the timestamp in the authorization token, and then the acquiring bank pays the amount indicated in the authorization token.

The authorization request message and authorization token can include a hash of an order description instead of the actual order description, the order description itself being available separately at the merchant, the merchant validating that the authorization token refers to the same order description by comparing the hash of the order description in the authorization token against a locally-computed hash of the same order description.

Although specific embodiments of the invention have been disclosed, it will be understood by those skilled in the art that changes can be made to those specific embodiments without departing from the spirit and the scope of the invention.

What is claimed is:

1. A method for electronic commerce, comprising:

forming a four party payment protocol for electronic sales including a consumer's computer coupled to a merchant's computer and to an issuing bank computer via an issuer gateway, the merchant computer being further coupled to an acquiring bank computer;

sending from a merchant's computer over an internet network to a consumer's computer, a merchant message including a wallet initiation message, a merchant digital signature, and a digital certificate from an acquiring bank, said wallet initiation message including a payment amount, an order description, and a timestamp;

starting a consumer's wallet program in said consumer's computer in response to said wallet initiation message;

sending from said consumer's computer consumer identity and authentication information and said merchant message, to an issuer gateway for an issuing bank;

the issuing bank creating a reference number or value representing the consumer's credit or debit card number by repairing a table of credit card or debit card numbers and a corresponding table of reference numbers, the issuing bank pairing the consumer's card number with a selected reference number and outputting the reference number to the issuer gateway;

verifying at said issuer gateway said merchant's signature to prove that the consumer is dealing with the actual merchant and validating at said issuer gateway the merchant's certificate and the acquirer's certificate to prove that the merchant and issuer share a common financial arrangement;

said issuer gateway verifying the consumer's account and ensuring that funds and/or credit are available to support the payment amount, then authorizing payment by sending to the consumer over said internet network an authorization token, an issuer's digital certificate, said wallet initiation message, and a reference to said consumer's credit or debit card number;

said authorization token including the payment amount, order description, timestamp, a random nonce plus a merchant identifier and a reference to the consumer's credit or debit card number; and said merchant's computer receiving said authorization token and fulfilling said order description.

2. The method for electronic commerce of claim 1, which further comprises:

sending from said consumer's computer a start message over the internet network to the merchants computer, to initiate said merchant's message.

3. The method for electronic commerce of claim 1, wherein said wallet initiation message includes a nonce.

4. The method for electronic commerce of claim 1, wherein said merchant's computer further performs the steps comprising:

receiving said authorization token;

verifying the issuer's signature, digital certificate, the payment amount and merchant identity in the authorization token;

verifying the freshness of the authorization token via the timestamp in the token;

using the nonce in the authorization token to recognize duplicate tokens; and fulfilling said order description.

5. The method for electronic commerce of claim 1, wherein said consumer identity and authentication information is a userid and a password.

6. The method for electronic commerce of claim 1, wherein said consumer identity and authentication information is an ATM debit card number and PIN.

7. The method for electronic commerce of claim 1, wherein said consumer identity and authentication information is a smart card's account number and a symmetric Message Authentication Code (MAC).

8. The method for electronic commerce of claim 1, wherein said consumer identity and authentication information is a smart card's account number and an asymmetric digital signature.

9. The method for electronic commerce of claim 1, wherein said consumer identity and authentication information is a consumer's digital signature and digital certificate.

10. The method for electronic commerce of claim 1, wherein said authorization token includes a dummy card number for use in routing payment to an appropriate one of a plurality of issuing banks;

said dummy card number being shared among all cardholders of a particular issuing bank.

11. The method for electronic commerce of claim 1, wherein said consumer identity and authentication information is a consumer's digital certificate and matching asymmetric digital signature.

12. The method for electronic commerce of claim 1, wherein said consumer identity and authentication information is a is a user account number and a symmetric MAC or asymmetric digital signature.

13. The method for electronic commerce of claim 1, wherein said consumer identity and authentication information is a is a user account number and an asymmetric digital signature.

14. The method for electronic commerce of claim 1, wherein said consumer identity information is a consumer's biometric signal.

15. The method for electronic commerce of claim 1, wherein said issuer gateway sends said authorization token to said consumer, and the consumer forwards said authorization token to said merchant.

16. The method for electronic commerce of claim 1, wherein said issuer gateway sends said authorization token directly to said merchant.

17. The method for electronic commerce of claim 1, wherein said reference to said credit card is an alias card number that is mapped at the issuing bank to the real card number, thereby preventing use of the consumer's credit card number without said authorization token.

18. The method for electronic commerce of claim 1, wherein said reference to said card is an authorization number allocated uniquely by the issuer gateway for each authorization, enabling it to be passed by an acquirer gateway back to the issuing bank in a capture message;

said issuing bank maintaining a database mapping authorization numbers to card numbers, so that when the issuing bank receives the capture message, it uses the database mapping to determine the consumer's card number.

19. The method for electronic commerce of claim 1, which further comprises:

a digital certificate hierarchy that covers issuing banks, acquiring banks, and merchants.

20. The method for electronic commerce of claim 19, wherein said certificate hierarchy is used with public-key digital signatures to identify said merchant and said issuing bank.

21. The method for electronic commerce of claim 20, wherein said certificates represent common financial agreements and obligations among said merchant and said issuing bank.

22. The method for electronic commerce of claim 21, wherein the issuing bank certificates identify and help authenticate issuing banks to merchants, providing a basis for the merchants to trust the authorization tokens provided by the issuing banks.

23. The method for electronic commerce of claim 22, wherein an acquiring bank certificate and a merchant certificate identify and help authenticate said acquiring bank and said merchant to issuing banks;

said merchant certificate identifying the merchant to the consumer and verifying that the merchant is a valid participant of a payment scheme, before the issuing bank provides said authorization token.

24. The method for electronic commerce of claim 1, wherein split shipments are supported by an additional message interaction between the merchant and issuer gateway, comprising:

the merchant sending the authorization token to the issuer gateway identified in the issuer's digital certificate, including details of a split requirement, such as the amount of a first payment, the merchant authenticating the request by signing it and including the merchant's digital certificate;

the issuer gateway verifying that the merchant signing message is the same merchant that signed an original request, verifying the split request according to business and risk management policies, and responding with a new authorization token in a message to the merchant;

the merchant forwarding the new authorization token in a capture message the acquirer gateway;

the merchant resubmitting the new authorization token to the acquirer gateway m a second message, whenever the merchant has shipped a second part of the shipment.

25. The method for electronic commerce of claim 1, comprising:

the issuer offering the consumer a payment schedule conditioned on the merchant name from the merchant's digital certificate and the amount of payment from the initiation message.

26. The method of claim 1 further comprising:

sending a capture request message including the reference number representing the consumer's card number over the internet from the merchant to an acquirer gateway operating on behalf of an acquirer bank to capture the transaction and disburse payment to the merchant.

27. The method of claim 1 further comprising the step of:

settling accounts with the issuing bank by the acquiring bank over a private network by sending a settlement message that includes the reference number to the consumer's card number.

28. The method of claim 1 further comprising the step of converting the reference number into the consumer's card number by the issuing bank and applying the transaction amount to the consumer's balance in his credit card or deposit account.

29. The method of claim 1 further comprising the step of:

proving that the issuing bank authorized the payment to the merchant by the combination of the issuing bank's signature on the authorization token, digital certificate, and the contents of the authorization token, providing undeniable proof that the issuing bank authorized the payment.

30. A system for electronic commerce, comprising:

connecting apparatus which forms a four party payment protocol for electronic sales including a consumer's computer coupled to a merchant's computer and to an issuing bank computer via an issuer gateway, the merchant computer being further coupled to an acquiring bank computer;

the merchant's computer sending over an internet network to the consumer's computer, a merchant message including a wallet initiation message, a merchant digital signature, and a digital certificate from an acquiring bank, said wallet initiation message including a payment amount, an order description, and a timestamp;

the consumer's wallet program in said consumer's computer responsive to said wallet initiation message, for sending from said consumer's computer consumer identity and authentication information and said merchant message, to the issuer gateway for an issuing bank;

the issuing bank creating a reference number or value representing the consumer's credit or debit card number by preparing a table of credit card or debit card numbers and a corresponding table of reference numbers, the issuing bank pairing the consumer's card number with a selected reference number and outputting the reference number to the issuer gateway;

the issuer gateway verifying said merchant's signature to prove that the consumer is dealing with the actual merchant and validating at said issuer gateway the merchant's certificate and the acquirer's certificate to prove that the merchant and issuer share a common financial arrangement;

said issuer gateway verifing the consumer's account and ensuring that funds and/or credit are available to support the payment amount, then authorizing payment by sending over said internet network an authorization token, an issuer's digital certificate, said wallet initiation message, and a reference to said consumer's credit or debit card number;

said authorization token including the payment amount, order description, timestamp, a random nonce plus a merchant identifier and a reference to the consumer's credit or debit card number;

said merchant's computer receiving said authorization token and fulfilling said order description; and said merchant sending a capture request message including the reference number representing the consumer's card number over the internet to an acquirer gateway operating on behalf of an acquirer bank to capture the transaction and disburse payment to the merchant.

31. A computer program product, comprising:

computer program code forming a four party payment protocol for electronic sales including a consumer's computer coupled to a merchant's computer and to an issuing bank computer via an issuer gateway, the merchant computer being further coupled to an acquiring bank computer;

computer program code means for sending from the merchant's computer over an internet network to the consumer's computer, a merchant message including a wallet initiation message, a merchant digital signature, and a digital certificate from an acquiring bank, said wallet initiation message including a payment amount, an order description, and a timestamp;

computer program code means for starting a consumer's wallet program in said consumer's computer in response to said wallet initiation message;

computer program code means for sending from said consumer's computer consumer identity and authentication information and said merchant message, to the issuer gateway for an issuing bank;

computer program code at the issuing bank creating a reference number or value representing the consumer's credit or debit card number by preparing a table of credit card or debit card numbers and a corresponding table of reference numbers, the issuing bank pairing the consumer's card number with a selected reference number and outputting the reference number to the issuer gateway;

computer program code verifying at said issuer gateway said merchant's signature to prove that the consumer is dealing with the actual merchant and validating at said issuer gateway the merchant's certificate and the acquirer's certificate to prove that the merchant and issuer share a common financial arrangement;

said issuer gateway verifying the consumer's account and ensuring that funds and/or credit are available to support the payment amount, then authorizing payment by sending over said internet network an authorization token, an issuer's digital certificate, said wallet initiation message, and a reference to said consumer's credit or debit card number;

said authorization token including the payment amount, order description, timestamp, a random nonce plus a merchant identifier and a reference to the consumer's credit or debit card number;

said merchant's computer receiving said authorization token and fulfilling said order description; and computer program code at the acquiring bank settling accounts with the issuing bank over a private network by sending a settlement message that includes the reference number to the consumer's card number.

32. A data processing system for electronic commerce, comprising: connecting apparatus which forms a four party payment protocol for electronic sales including a consumer's computer coupled to a merchant's computer and to an issuing bank computer via an issuer gateway, the merchant computer being further coupled to an acquiring bank computer;

sending apparatus which sends from a merchant's computer over an internet network to a consumer's computer, a merchant message including a wallet initiation message, a merchant digital signature, and a digital certificate from an acquiring bank, said wallet initiation message including a payment amount, an order description, and a timestamp;

means for starting a consumer's wallet program in said consumer's computer in response to said wallet initiation message;

means for sending from said consumer's computer consumer identity and authentication information and said merchant message, to an issuer gateway for an issuing bank;

the issuing bank creating a reference number or value representing the consumer's credit or debit card number by preparing a table of credit card or debit card numbers and a corresponding table of reference numbers, the issuing bank pairing the consumer's card number with a selected reference number and outputting the reference number to the issuer gateway;

means for verifying at said issuer gateway said merchant's signature to prove that the consumer is dealing with the actual merchant and validating at said issuer gateway the merchant's certificate and the acquirer's certificate to prove that the merchant and issuer share a common financial arrangement;

said issuer gateway verifying the consumer's account and ensuring that finds and/or credit are available to support the payment amount, then authorizing payment by sending over said internet network an authorization token, an issuer's digital certificate, said wallet initiation message, and a reference to said consumer's credit or debit card number;

said authorization token including the payment amount, order description, timestamp, a random nonce plus a merchant identifier and a reference to the consumer's credit or debit card number;

said merchant's computer receiving said authorization token and fulfilling said order description; and the issuing bank converting the reference number into the consumer's card number and applying the transaction amount to the consumer's balance in his credit card or deposit account.

33. The data processing system for electronic commerce of claim 32, which further comprises:

means for sending from said consumer's computer a start message over the internet network to the merchant's computer, to initiate said merchant's message.

34. The data processing system for electronic commerce of claim 32, wherein said wallet initiation message includes a nonce.

35. The data processing system for electronic commerce of claim 32, wherein said merchant's computer further comprises:

means for receiving said authorization token;

means for verifying the issuer's signature, digital certificate, the payment amount and merchant identity in the authorization token;

means for verifying the freshness of the authorization token via the timestamp in the token;

means for using the nonce in the authorization token to recognize duplicate tokens; and means for fulfilling said order description.

36. The data processing system for electronic commerce of claim 32, wherein said reference to said credit card is a consumer credit or debit account number.

37. A method for electronic commerce, comprising;

forming a four party payment protocol for electronic sales including a consumer's computer coupled to a merchant's computer and to an issuing bank computer via an issuer gateway, the merchant computer being further coupled to an acquiring bank computer;

sending from a merchant's computer over an internet network to a consumer's computer, a merchant message including a wallet initiation message, a merchant digital signature, and a digital certificate from an acquiring bank, said wallet initiation message including a payment amount, an order description, and a timestamp;

said acquiring bank's digital certificate containing a network address or URL that identifies the network location of said acquiring bank contacted via an internet network as part of a payment protocol;

starting a consumer's wallet program in said consumer's computer in response to said wallet initiation message;

sending from said consumer's computer consumer identity and authentication information and said merchant message, to an issuer gateway for an issuing bank;

the issuing bank creating a reference number or value representing the consumer's credit or debit card number by preparing a table of credit card or debit card numbers and a corresponding table of reference numbers, the issuing bank pairing the consumer's card number with a selected reference number and outputting the reference number to the issuer gateway;

verifying at said issuer gateway said merchant's signature to prove that the consumer is dealing with the actual merchant and validating at said issuer gateway the merchant's certificate and the acquirer's certificate to prove that the merchant and issuer share a common financial arrangement;

said issuer gateway verifying the consumer's account and ensuring that funds and/or credit are available to support the payment amount, then authorizing payment by sending over said internet network an authorization token, an issuer's digital certificate, said wallet initiation message, and a reference to said consumer's credit or debit card number;

said issuer's digital certificate containing a network address or URL that identifies the network location of the issuer contacted via an internet network as part of a payment protocol;

said authorization token including the payment amount, order description, timestamp, a random nonce plus a merchant identifier and a reference to the consumer's credit or debit card number;

said merchant's computer receiving said authorization token and fulfilling said order description;

said merchant sending a capture request message including the reference number representing the consumer's card number over the internet to an acquirer gateway operating on behalf of an acquirer bank to capture the transaction and disburse payment to the merchant;

the acquiring bank settling accounts with the issuing bank over a private network by sending a settlement message that includes the reference number to the consumer's card number; and the issuing bank converting the reference number into the consumer's card number and applying the transaction amount to the consumer's balance in his credit card or deposit account.

38. A method for electronic commerce, comprising:

forming a four party payment protocol for electronic sales including a consumer's computer coupled to a merchant's computer and to an issuing bank computer via an issuer gateway, the merchant computer being further coupled to an acquiring bank computer;

sending from the consumer's computer consumer to an issuer gateway for an issuing bank, an authorization request message containing consumer identity and authentication information, payment amount, an order description, a timestamp, a digital certificate representing a merchant, and a digital certificate representing the merchant's acquiring bank;

said merchant's digital certificate containing a merchant identifier unique for the acquiring bank;

said acquiring bank's digital certificate containing a bank identifier unique among all banks sharing a common financial arrangement;

validating at said issuer gateway the merchant's certificate and the acquirer's certificate to prove that the merchant, acquirer, and issuer share a common financial arrangement;

said issuer gateway verifying the consumer's account and ensuring that funds and/or credit are available to support the payment amount, then authorizing payment by sending over said internet network an authorization token, an issuer's digital certificate, and a reference to said consumer's credit or debit card number;

said authorization token including the payment amount, order description, timestamp, a random nonce, said merchant identifier from the merchant's digital certificate, and said acquiring bank identifier from said acquiring bank's digital certificate, plus a reference to the consumer's credit or debit card number;

said authorization token being digitally signed by the issuing bank;

said merchant's computer receiving said authorization token and fulfilling said order description said merchant sending a capture request message including the reference number representing the consumer's card number over the internet to an acquirer gateway operating on behalf of an acquirer bank to capture the transaction and disburse payment to the merchant;

the acquiring bank settling accounts with the issuing bank over a private network by sending a settlement message that includes the reference number to the consumer's card number; and the issuing bank converting the reference number into the consumer's card number and applying the transaction amount to the consumer's balance in his credit card or deposit account.

39. The method for electronic commerce of claim 38, which further comprises:

sending from a merchant's computer over an internet network to a consumer's computer, a merchant message including a wallet initiation message, a merchant digital certificate, and a digital certificate from an acquiring bank, said wallet initiation message including a payment amount, an order description, and a timestamp;

starting a consumer's wallet program in said consumer's computer in response to said wallet initiation message;

said consumer's wallet program sending the authorization request message.

40. The method for electronic commerce of claim 39, which further comprises:

including with the wallet initiation message a merchant's digital signature of the wallet initiation message;

including the wallet initiation message and said merchant's digital signature in the authorization request message;

verifying at said issuer gateway said merchant's signature to prove that the consumer is dealing with the actual merchant.

41. The method for electronic commerce of claim 40, which further comprises:

sending from said consumer's computer a start message over the internet network to the merchant's computer, to initiate said merchant's message.

42. The method for electronic commerce of claim 40, wherein said wallet initiation message includes a nonce.

43. The method for electronic commerce of claim 40, wherein said merchant's computer further performs the steps comprising:

receiving said authorization token;

verifying the issuer's signature, digital certificate, the payment amount and merchant identity in the authorization token;

verifying the freshness of the authorization token via the timestamp in the token;

using the nonce in the authorization token to recognize duplicate tokens; and fulfilling said order description.

44. The method for electronic commerce of claim 38, wherein the merchant claims payment through the acquiring bank by forwarding the customer reference number and payment amount to the acquiring bank.

45. The method for electronic commerce of claim 44, where in the case of a subsequent dispute, the merchant proves payment authorization by submitting a copy of the authorization token and issuer's digital certificate to the acquiring bank.

46. The method for electronic commerce of claim 38, wherein the merchant claims payment through the acquiring bank by forwarding the authorization token and issuer's digital certificate to the acquiring bank;

the acquiring bank verifying the issuer's signature on the authorization token, validating the issuer's digital certificate, checking for duplicates via the timestamp in the authorization token; and the acquiring bank paying the amount indicated in the authorization token.

47. The method for electronic commerce of claim 38, wherein said authorization request message and authorization token includes a hash of an order description instead of the actual order description, the order description itself being available separately at the merchant, the merchant validating that the authorization token refers to the same order description by comparing the hash of the order description in the authorization token against a locally-computed hash of the same order description.

48. The method for electronic commerce of claim 38, wherein said reference to said credit card is a consumer credit or debit account number.

49. The method for electronic commerce of claim 48, wherein the confidentiality of said credit or debit account number is maintained by using a higher-level security protocol, such as encrypted email or SSL, to protect the communications among the consumer and the issuer gateway, the consumer and the merchant, the issuer gateway and the merchant, and, if applicable, the merchant and the acquirer.

50. A method for electronic commerce, comprising:

forming a four party payment protocol for electronic sales, the four party payment protocol including a consumer's computer coupled to a merchant's computer and to an issuing bank computer via an issuer gateway, the merchant computer being further coupled to an acquirer bank computer;

sending from the merchant's computer over an internet network to the consumer's computer, a merchant message including a wallet initiation message, and a digital certificate of a merchant provided by an acquiring bank, said wallet initiation message including a payment amount, an order description, a merchant identifier and a timestamp;

starting a consumer's wallet program in said consumer's computer in response to said wallet initiation message;

sending from said consumer's computer consumer identity and authentication information and said merchant message, to the issuer gateway for an issuing bank;

the issuing bank creating a reference number or value representing the consumer's credit or debit card number by preparing a table of credit card or debit card numbers and a corresponding table of reference numbers, the issuing bank pairing the consumer's card number with a selected reference number and outputting the reference number to the issuer gateway;

verifying at said issuer gateway that the merchant and issuer share a common financial arrangement;

said issuer gateway verifying the consumer's account and ensuring that funds and/or credit are available to support the payment amount, then authorizing payment by sending over said internet network an authorization token, an issuer's digital certificate, said wallet initiation message, and a reference to said consumer's credit or debit card number;

said authorization token including the payment amount, order description, timestamp, a random nonce plus a merchant identifier and a reference to the consumer's credit or debit card number;

said merchant's computer receiving said authorization token and fulfilling said order description; and sending a capture request message including the reference number representing the consumer's card number over the internet from the merchant to an acquirer gateway operating on behalf of an acquirer bank to capture the transaction and disburse payment to the merchant.

51. The method of claim 50 further comprising:

providing the merchant's digital signature and matching certificate to the consumer's computer.

52. The method of claim 50 further comprising the issuer gateway signing the authorization token.

53. A system for electronic commerce, comprising:

means for forming a four party payment protocol for electronic sales, the four party payment protocol including a consumer's computer coupled to a merchant's computer and to an issuing bank computer via an issuer gateway, the merchant computer being further coupled to an acquirer bank computer;

the merchant's computer sending over an internet network to the consumer's computer, a merchant message including a wallet initiation message, and a digital certificate of a merchant provided by an acquiring bank, said wallet initiation message including a payment amount, an order description, a merchant identifier and a timestamp;

a consumer's wallet program in said consumer's computer responsive to said wallet initiation message, for sending from said consumer's computer consumer identity and authentication information and said merchant message, to the issuer gateway for an issuing bank;

the issuing bank creating a reference number or value representing the consumer's credit or debit card number by preparing a table of credit card or debit card numbers and a corresponding table of reference numbers, the issuing bank pairing the consumer's card number with a selected reference number and outputting the reference number to the issuer gateway;

the issuer gateway verifying that the merchant and issuer share a common financial arrangement;

said issuer gateway verifying the consumer's account and ensuring that funds and/or credit are available to support the payment amount, then authorizing payment by sending over said internet network an authorization token, an issuer's digital certificate, said wallet initiation message, and a reference to said consumer's credit or debit card number;

said authorization token including the payment amount, order description, timestamp, a random nonce plus a merchant identifier and a reference to the consumer's credit or debit card number;

said merchant's computer receiving said authorization token and fulfilling said order description; and settling apparatus which settles accounts with the issuing bank by the acquiring bank over a private network by sending a settlement message that includes the reference number to the consumer's card number.

54. The system of claim 53 further comprising:

means for providing the merchant's digital signature and matching certificate to the consumer's computer; and means for the issuing gateway to sign the authorization token.

* * * * *